United States Patent [19]

Karouji

[11] Patent Number: 5,794,022

[45] Date of Patent: Aug. 11, 1998

[54] INFORMATION PROCESSING DEVICE WITH IMPROVED TIMING OF CLOCK AND RESET SIGNALS

[75] Inventor: Takayuki Karouji, Kanagawa-ken, Japan

[73] Assignee: Kabushiki Kaisha Toshiba, Kawasaki, Japan

[21] Appl. No.: 751,948

[22] Filed: Nov. 19, 1996

[30] Foreign Application Priority Data

Nov. 20, 1995 [JP] Japan ................... 7-301396

[51] Int. Cl.⁶ ................... G06F 1/04; G06F 1/30
[52] U.S. Cl. ................... 395/560; 395/750.04
[58] Field of Search ................... 395/560, 750, 395/750.04

[56] References Cited

U.S. PATENT DOCUMENTS

| | | | |
|---|---|---|---|
| 4,642,757 | 2/1987 | Sakamoto | 395/560 X |
| 4,653,018 | 3/1987 | Stadlmeier et al. | 395/560 |
| 5,179,693 | 1/1993 | Kitamura et al. | 395/560 |
| 5,511,203 | 4/1996 | Wisor et al. | 395/750 |

*Primary Examiner*—Thomas M. Heckler
*Attorney, Agent, or Firm*—Oblon, Spivak, McClelland, Maier & Neustadt, P.C.

[57] ABSTRACT

An information processing device with improved timing of clock and reset signals, wherein at a rise time of a power supply voltage, when a clock signal generated by a buffer gate based on a sinusoidal wave reference signal output from an oscillation circuit is detected by a monitor circuit, a reset release signal is supplied from a reset circuit to a microcomputer after a predetermined time lapse specified by a delay circuit consisting of OR gates and a series of F/Fs while, at a fall time of the power supply voltage, when a similar state to a previous state when the clock signal has been terminated is detected by the monitor circuit, the clock signal is terminated after a reset signal is supplied to the microcomputer.

4 Claims, 9 Drawing Sheets

FIG.6B-1
VDD

FIG.6B-2
IN

FIG.6B-3
FVout

FIG.6B-4
A

FIG.6B-5
RMSout

FIG.6B-6
B

FIG.6B-7
OUT

INFORMATION PROCESSING DEVICE WITH IMPROVED TIMING OF CLOCK AND RESET SIGNALS

BACKGROUND OF THE INVENTION

1. Field of the Invention

The present invention relates to a technology of timing to supply a clock signal and a reset signal at the rise and fall times of power supply voltage in an information processing device to which a battery is available as a power supply.

2. Description of the Prior Art

Figure 1:
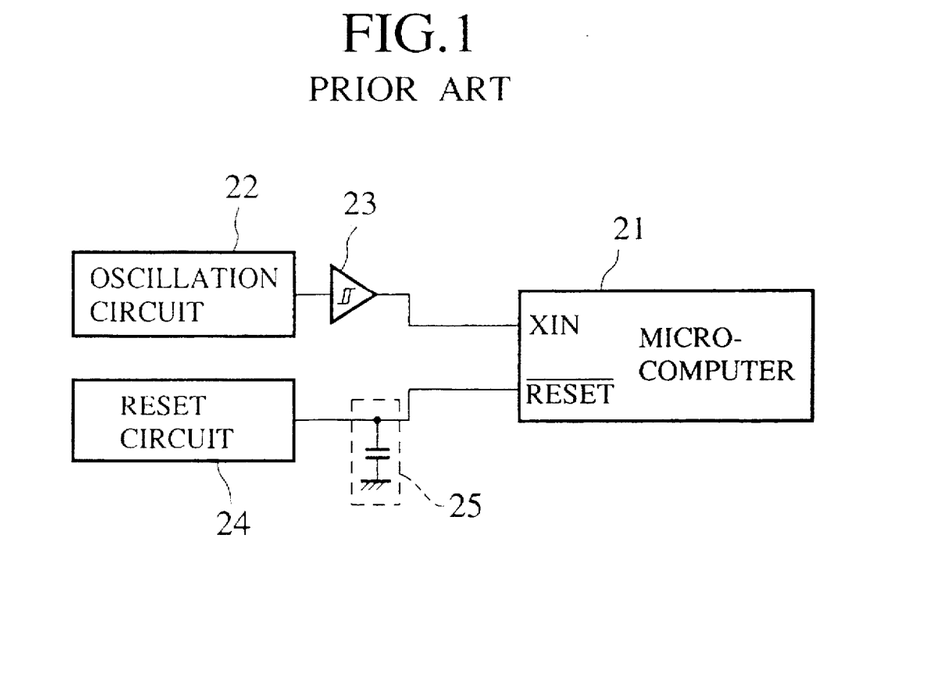
FIG. 1 is a block circuit diagram showing a configuration of a conventional information processing device.

As an information processing device, for example, a conventional portable microcomputer which is able to use a battery as a power supply, the device constructed as shown in FIG. 1 has already been known.

In FIG. 1, a clock signal generating circuit 23 receives a sinusoidal wave reference signal output from an oscillation circuit 22 which is provided independently from a microcomputer 21. The microcomputer 21 receives a clock signal generated by the clock signal generating circuit 23 to operate in synchronism with the clock signal. The microcomputer 21 is reset by a reset signal when it receives the reset signal output from a reset circuit 24 which is provided independently from the microcomputer 21, and is then released from its reset state by a reset release signal output from the reset circuit 24.

In such microcomputer 21, a single power supply is used commonly to the microcomputer 21, the oscillation circuit 22, the clock signal generating circuit 23, and the reset circuit 24. A normal operation of the microcomputer 21 can be assured under the condition that, at the rise time of power supply voltage, a reset release signal is input into the microcomputer 21 after the clock signal is input into the microcomputer 21 and that, at the fall time of power supply voltage, input of the clock signal is cut off after the reset signal is input into the microcomputer 21 to bring it into its reset state.

Figure 9:
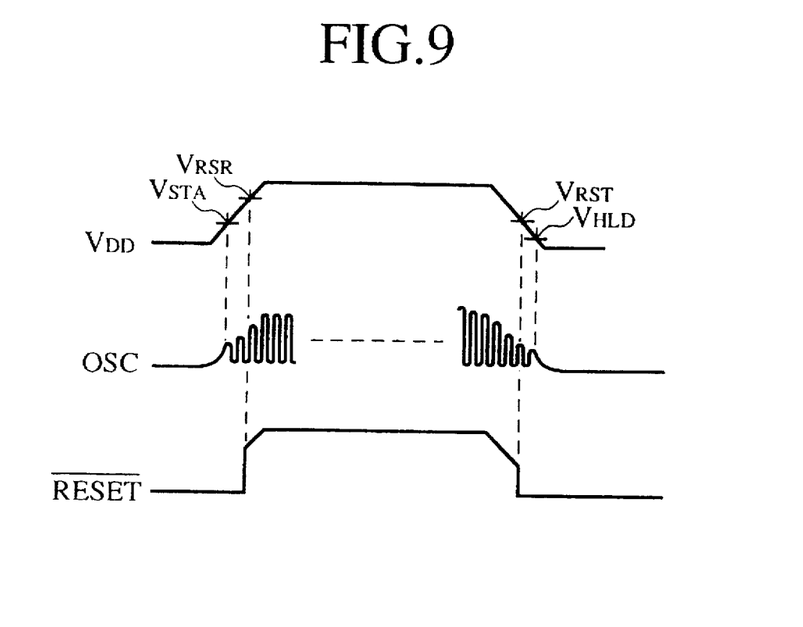
FIG. 9 is a timing chart illustrating an operation of the information processing device according to the embodiment of the present invention if a clock signal and a reset signal are in normal operational states.

More particularly, as shown in FIG. 9, in the course of the event that the sinusoidal wave reference signal OSC comes to predetermined frequency and amplitude with the increase in power supply voltage $V_{DD}$, a power supply voltage $V_{STA}$ must be set lower than a power supply voltage $V_{RSR}$ (i.e., $V_{STA} < V_{RSR}$) at the rise time of power supply voltage. Where $V_{STA}$ is a power supply voltage for the oscillation circuit 22 when the reference signal reaches its frequency and amplitude to generate the clock signal and thus the clock signal is input into the microcomputer 21, and $V_{RSR}$ is a power supply voltage for the reset circuit 24 when the reset release signal is output from the reset circuit 24 to the microcomputer 21. On the contrary, in the course of the event that the reference signal OSC is gradually terminated as the power supply voltage $V_{DD}$ decreases, a power supply voltage $V_{RST}$ must be set higher than a power supply voltage $V_{HLD}$ (i.e., $V_{RST} > V_{HLD}$) at the fall time of power supply voltage. Where $V_{RST}$ is a power supply voltage for the reset circuit 24 when the reset signal is generated to be input into the microcomputer 21, and $V_{HLD}$ is a power supply voltage for the oscillation circuit 22 when supply of the clock signal to the microcomputer 21 is terminated.

Figure 2:
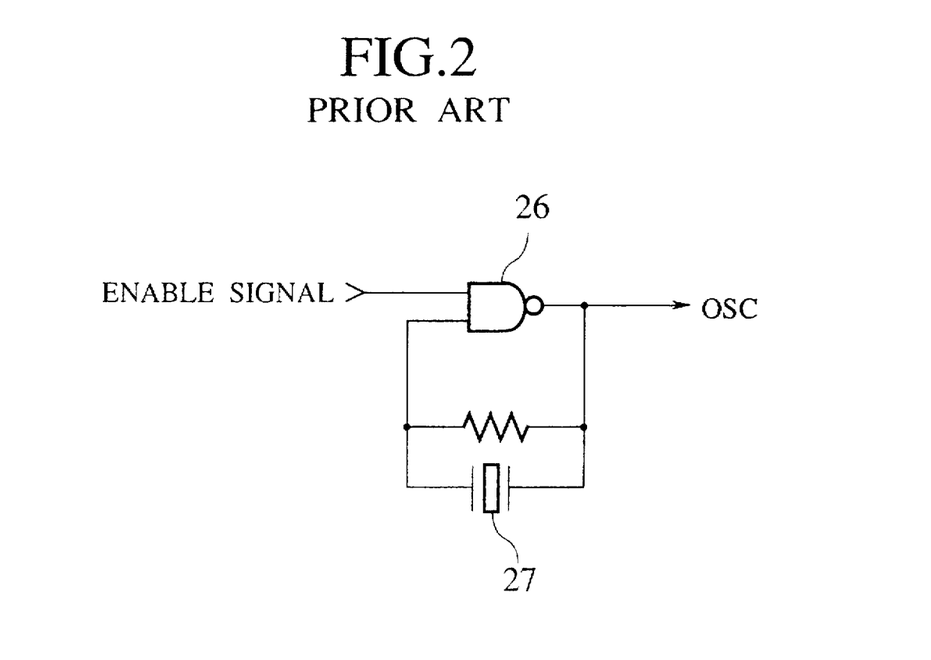
FIG. 2 a circuit diagram showing a configuration of an oscillation circuit in FIG. 1.

For the purposes of example, as shown in FIG. 2, the oscillation circuit 22 consists of a non-conjunction (NAND) gate 26, and a quartz oscillator 27 connected between one input terminal and an output terminal of the NAND gate 26. The sinusoidal wave reference signal OSC is generated by the oscillation circuit 22 when an enable signal is input into the other input terminal of the NAND gate 26. For instance, the NAND gate 26 is made up of a P-channel FET (Field Effect Transistor) and an N-channel FET.

Figure 3:
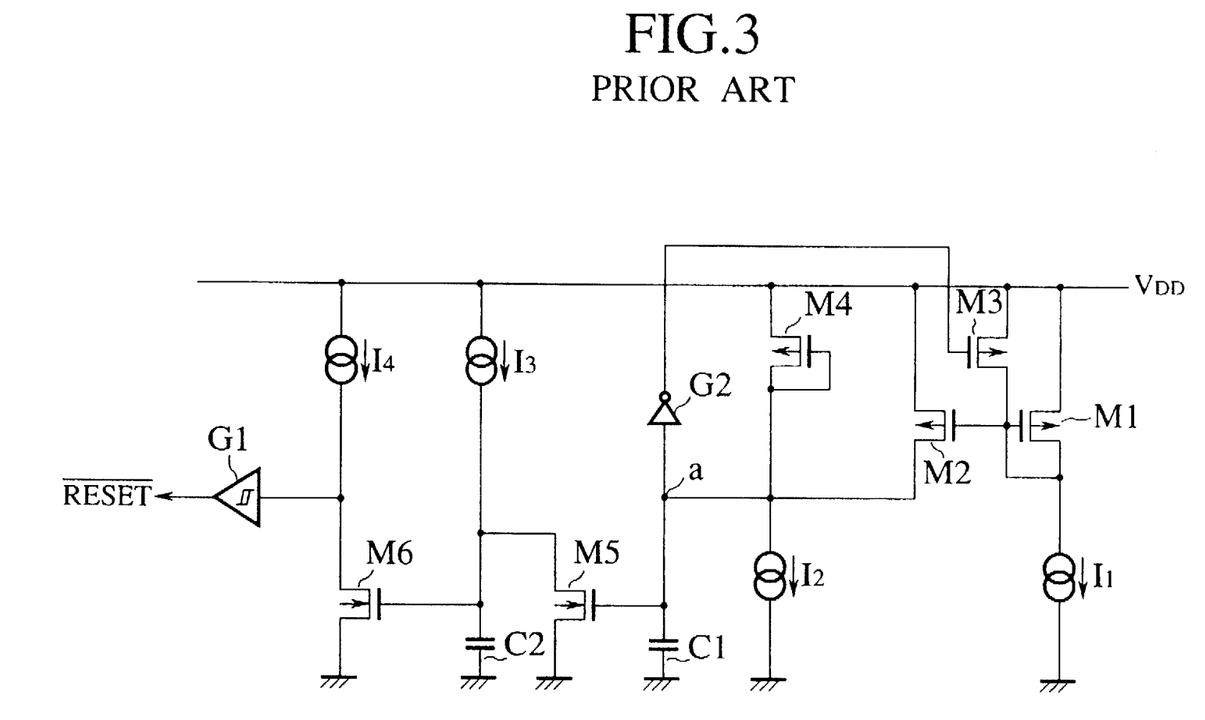
FIG. 3 is a circuit diagram showing a configuration of a reset circuit in FIG. 1.

For example, as shown in FIG. 3, the reset circuit 24 is composed of P-channel FETs M1 to M4, N-channel FETs M5 and M6, constant current sources I1 to I4, and a buffer gate G1 with a hysteresis function. When the power supply voltage $V_{DD}$ is lowered less than a sum of an absolute value $|V_{thp}|$ of a threshold value of the FET M4 and a threshold value $V_{thn}$ of the FET M5, the FET M5 is brought into its non-conductive state and the FET M6 is brought into its conductive state. The reset circuit 24 therefore outputs the reset signal (/RESET) of low level. In contrast, when the power supply voltage $V_{DD}$ is increased more than a sum of the absolute value $|V_{thp}|$ of the threshold value of the FET M4 and the threshold value $V_{thn}$ of the FET M5, the FET M5 is brought into its conductive state and the FET M6 is brought into its non-conductive state. The reset circuit 24 thus outputs the reset release signal (/RESET) of high level. The circuit consisting of the FETs M1 to M3, the constant current sources I1, I2, and an inverting gate G2 is provided to prevent a potential at a node a from being set to an intermediate potential which causes chattering, etc.

In this fashion, the oscillation circuit 22 and the reset circuit 23 have their own different output characteristics upon rising up and falling down the power supply voltage because of their different circuit configurations. For this reason, if the reset circuit 23 and the reset circuit 24 are constructed to include P-channel FETs and N-channel FETs, as shown in FIGS. 2 and 3, relationships of $V_{STA}$, $V_{RSR}$, $V_{RST}$, and $V_{HLD}$ to a sum $\Sigma V_{th}$ of absolute values of threshold values of P-channel FETs and threshold values of N-channel FETs, which are shown respectively in FIG. 10, must be maintained at all times to assure a normal operation of the microcomputer 21.

Figure 11:
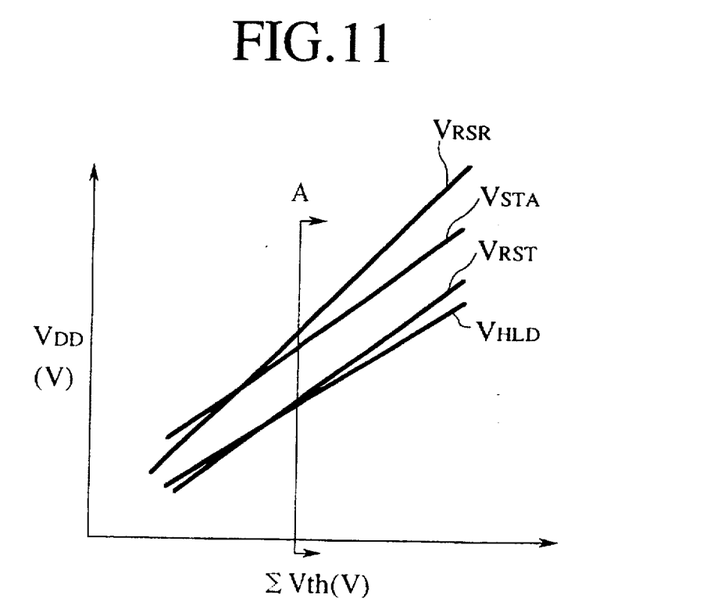
FIG. 11 is a characteristic diagram showing mutual relationship of $V_{STA}$, $V_{RSR}$, $V_{RST}$, and $V_{HLD}$ to $\Sigma V_{th}$ in an abnormal state.

However, since $\Sigma V_{th}$ is fluctuated due to variation in manufacture, there sometimes caused conditions $V_{STA} > V_{RSR}$ and $V_{RST} < V_{HLD}$ in relationships between respective $V_{STA}$, $V_{RSR}$, $V_{RST}$, $V_{HLD}$ and $\Sigma V_{th}$, as shown in FIG. 11. In such case, unless $\Sigma V_{th}$ exceeds the voltage indicated by a line A in FIG. 11, the microcomputer 21 cannot carry out its normal operation. In other words, if $\Sigma V_{th}$ is below the voltage indicated by the line A, the relationship between $V_{STA}$ and $V_{RSR}$ is reversed upon rising up power supply voltage and as a result the reset release signal is first input into the microcomputer 21 and then the clock signal is input into the microcomputer 21, while the relationship between $V_{RST}$ and $V_{HLD}$ is reversed upon falling down power supply voltage and therefore the reset signal is input into the microcomputer 21 after input of the clock signal to the microcomputer 21 is terminated. If the clock signal, the reset signal, and the reset release signal are input into the microcomputer 21 in such sequence, the microcomputer 21 is liable to run away.

Figure 10:
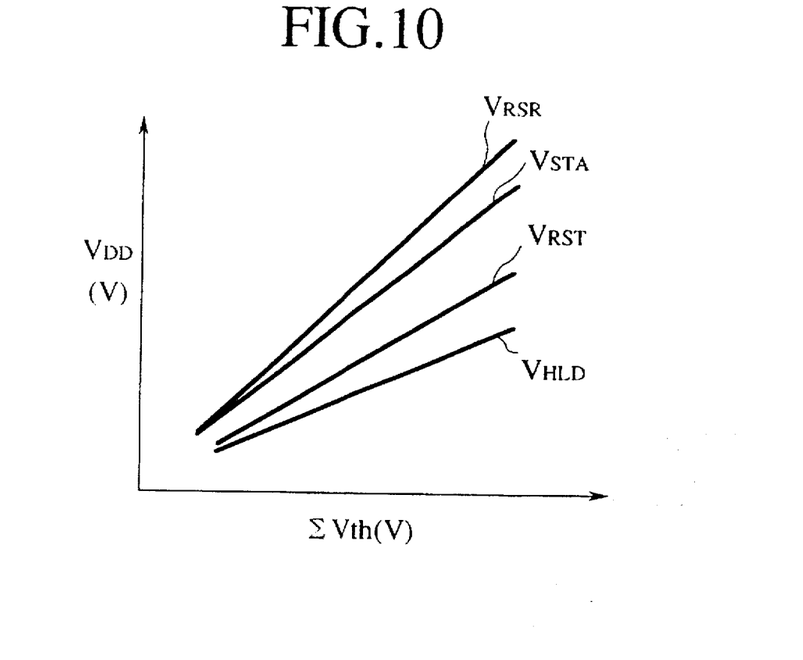
FIG. 10 is a characteristic diagram showing mutual relationship of $V_{STA}$, $V_{RSR}$, $V_{RST}$, and $V_{HLD}$ to $\Sigma V_{th}$ in a normal state.

Hence, in order to prevent such situation, trial manufacture of the oscillation circuit 22 and the reset circuit 23 has had to be repeated several times to achieve the relationships shown in FIG. 10 at all times even if $\Sigma V_{th}$ is varied.

Figure 4:
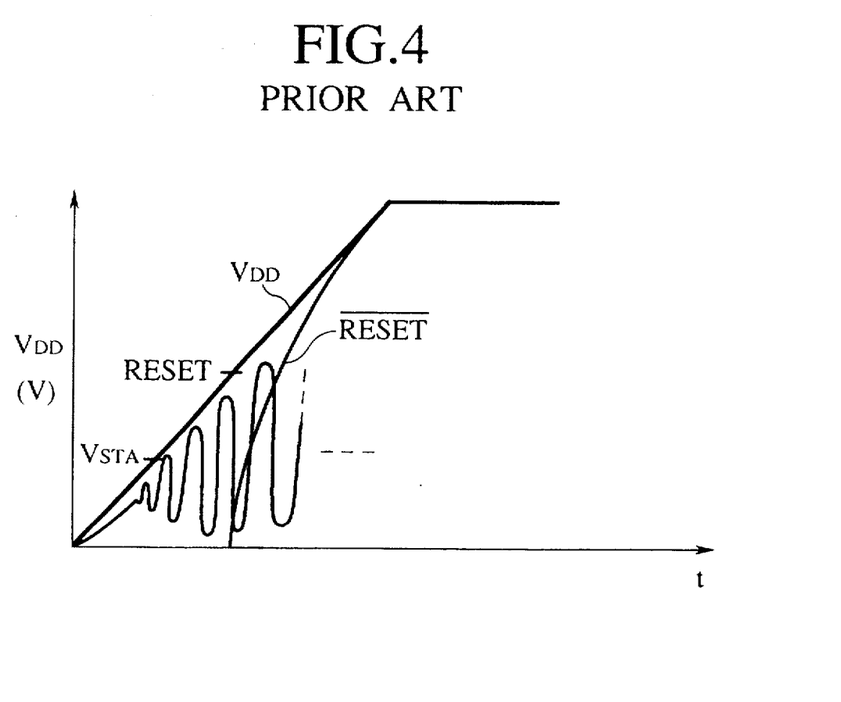
FIG. 4 is a characteristic diagram illustrating an operation of the conventional information processing device.

Still further, as shown in FIG. 4, input of the reset release signal to the microcomputer 21 has been delayed by attaching a capacitor 25 to an output line of the reset circuit 24, as shown in FIG. 1. However, according to this approach, if the information processing device is constructed as an IC device, it is hard to incorporate the capacitor 25 into the IC device since the capacitor 25 is required to have a large capacity to some extent. The capacitor 25 must be formed as an outside capacitor. In addition, input of the reset signal to the microcomputer 21 is delayed.

Therefore, according to this approach, it has been extremely difficult to stand together delayed input of the reset release signal to the microcomputer 21 upon rising up the power supply voltage and quick input of the reset signal to the microcomputer 21 upon falling down the power supply voltage.

As has been discussed earlier, in the conventional microcomputer in which the clock signal, the reset signal, and the reset release signal are supplied from the oscillation circuit and the reset circuit both being provided individually, it is likely that, because of variation of $\Sigma V_{th}$, input sequence of either the clock signal and the reset release signal at the rise time of the power supply voltage or the clock signal and the reset signal at the fall time of the power supply voltage is reversed, thus causing the microcomputer to run away. In the prior art, in order to avoid this problem, the oscillation circuit and the reset circuit have been designed after trial manufactures of the oscillation circuit and the reset circuit have been made several times not to reverse input sequence of the above signals because of variation in $\Sigma V_{th}$. To this end, enormous labor and time are required for manufacture of the oscillation circuit and the reset circuit in the prior art.

SUMMARY OF THE INVENTION

Therefore, the present invention has been made in the light of the above, and an object of the present invention is to provide an information processing device in which the clock signal, the reset signal, and the reset release can be supplied at proper timings at the rise and fall times of power supply voltage irrespective of variation in $\Sigma V_{th}$ and configurations for generating a clock signal, a reset signal, and a reset release signal.

In order to achieve the above object, according to the present invention, there is provided an information processing device comprising: information processing means which operates in synchronism with a clock signal, and is released from its reset state by a reset release signal and is reset by a reset signal; clock signal generating means for generating a clock signal to be supplied to the information processing means; reset signal generating means for generating a reset primitive signal and a reset release primitive signal; monitoring means for monitoring the clock signal generated by the clock signal generating means to detect generation of the clock signal and a previous state when the clock signal is terminated; and controlling means for receiving the reset primitive signal, the reset release primitive signal, and detected results of the monitoring means, and supplying the reset release signal to the information processing means at the rise time of power supply voltage after a predetermined time lapse after generation of the clock signal is detected and supplying the reset signal to the information processing means at the fall time of power supply voltage when a previous state when the clock signal is terminated is detected.

In a preferred aspect of the present invention, there is provided an information processing device comprising: an information processing portion which operates in synchronism with a clock signal, and is released from its reset state by a reset release signal and is reset by a reset signal; an oscillation circuit for oscillating a reference signal to generate the clock signal; a clock signal generating circuit for receiving the reference signal output from the oscillation circuit to generate the clock signal when the reference signal gets to predetermined frequency and amplitude; a monitor circuit for monitoring frequency and amplitude of the reference signal output from the oscillation circuit, outputting an enable signal at the rise time of power supply voltage when the frequency and amplitude of the reference signal reach certain values at which the clock signal is to be generated, and outputting a disable signal at the fall time of the power supply voltage before the frequency and amplitude of the reference signal reach certain values at which the clock signal is not to be generated; a reset circuit for outputting a reset primitive signal and a reset release primitive signal; a delay circuit for outputting a delay signal at the rise time of power supply voltage after a predetermined time lapse after a first clock signal is generated by the clock signal generating circuit; a first control gate for supplying the clock signal to the information processing portion in response to the rest release primitive signal or the enable signal at the rise time of power supply voltage, and cutting off supply of the clock signal to the information processing portion in response to the reset primitive signal and the disable signal at the fall time of power supply voltage; and a second control gate for supplying the reset release signal to the information processing portion in response to the enable signal, the delay signal, and the reset release primitive signal at the rise time of power supply voltage, and supplying the reset signal to the information processing portion in response to the reset primitive signal or the disable signal at the fall time of power supply voltage.

In a preferred aspect of the present invention, the delay circuit comprises, a third control gate for receiving an output from the first control gate and the delay signal as inputs, and a plurality of flip-flops consisting of n-stages series-connected flip-flops, for receiving an output from the third control gate to a clock terminal at a first stage.

In a preferred aspect of the present invention, the monitor circuit comprises, an F/V converter for converting frequency of the signal output from the oscillation circuit into voltage, an RMS/DC converter for converting AC voltage output from the oscillation circuit into DC voltage, a comparator for comparing voltage obtained by the RMS/DC converter with reference voltage, and an AND gate for receiving an output from the F/V converter and an output from the comparator, and performing their logical product operation.

The nature, principle and utility of the invention will become more apparent from the following detailed description when read in conjunction with the accompanying drawings.

DESCRIPTION OF THE PREFERRED EMBODIMENTS

Preferred embodiments of the present invention will be explained with reference to accompanying drawings hereinafter.

Figure 5:
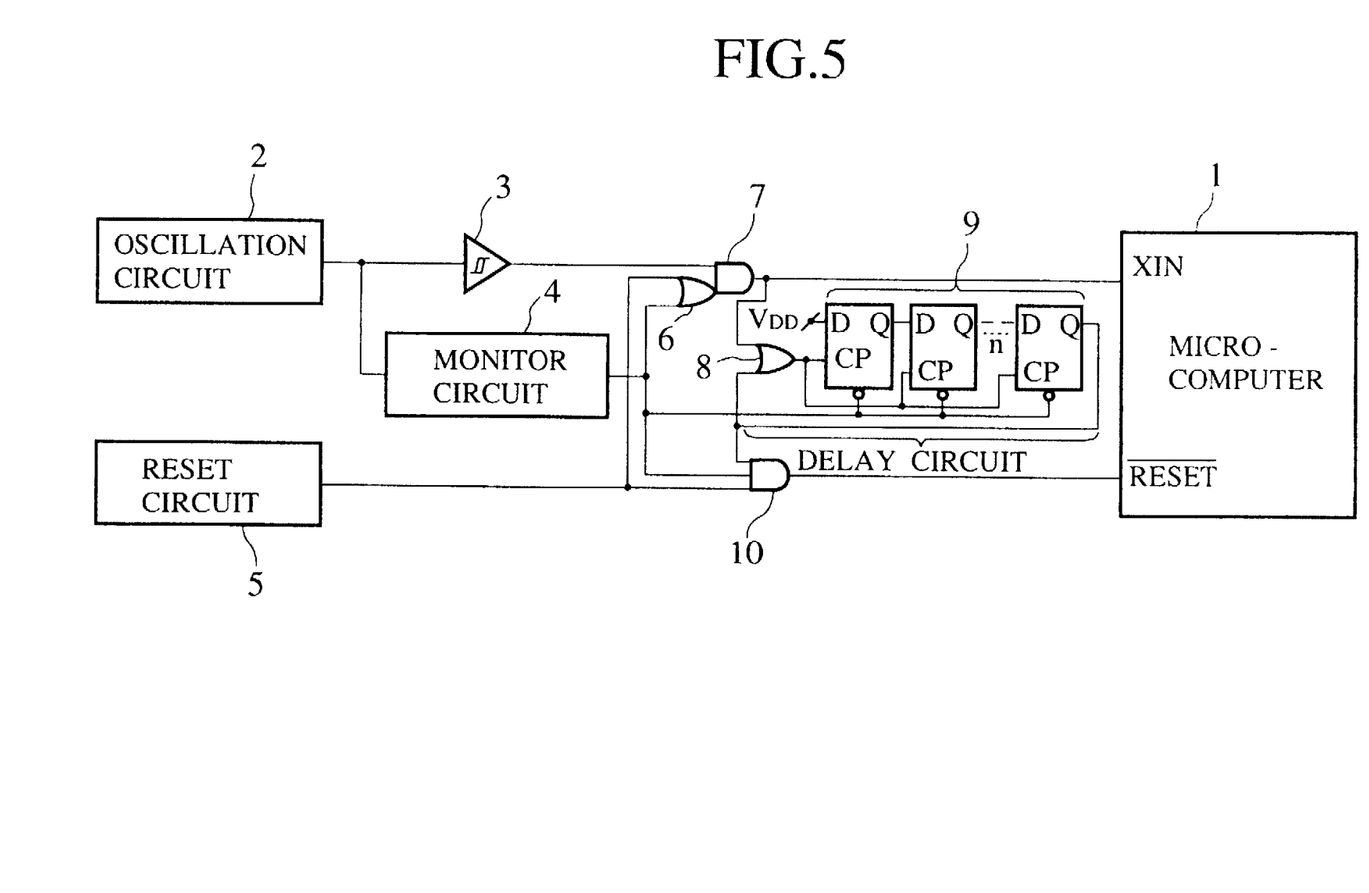
FIG. 5 is a circuit diagram showing a configuration of an information processing device according to an embodiment of the present invention.

FIG. 5 is a circuit diagram showing a configuration of an information processing device according to an embodiment of the present invention.

In FIG. 5, the information processing device which may use a battery as a power supply comprises a microcomputer 1 which operates in synchronism with a clock signal as an information processing portion, and is released from its reset state by a reset release signal, and is reset by a reset signal; an oscillation circuit 2 for oscillating a sinusoidal wave reference signal to generate the clock signal; a buffer gate 3 for receiving the reference signal oscillated by the oscillation circuit 2 to generate the clock signal; a monitor circuit 4 for monitoring frequency and amplitude of the reference signal oscillated by the oscillation circuit 2; a reset circuit 5 for outputting the reset signal and the reset release signal; a logical sum (OR) gate 6 and a logical product (AND) gate 7 for controlling supply of the clock signal to the microcomputer 1; an OR gate 8 and a series of flip-flop (F/F) 9 constituting a delay circuit; and an AND gate 10 for controlling supply of the reset release signal and the reset signal to the microcomputer 1.

In the microcomputer 1, its normal rising operation can be carried out at the rise time of the power supply voltage if the clock signal is input to a XIN terminal and then the reset release signal is input to a /RESET terminal, whereas its normal falling operation can be carried out at the fall time of the power supply voltage if the reset signal is input to the /RESET terminal and then supply of the clock signal is terminated.

The oscillation circuit 2 is composed in the same way as the conventional circuit, as shown in FIG. 2, for example. The oscillation circuit 2 receives an enable signal of high level at the rise time of the power supply voltage to start oscillation and then outputs a sinusoidal wave reference signal.

The buffer gate 3 is a gate with a hysteresis function used for waveform shaping. The buffer gate 3 shapes waveform of the sinusoidal wave reference signal output from the oscillation circuit 2. The buffer gate 3 then generates a rectangular wave clock signal when the reference signal comes to predetermined frequency and amplitude. The hysteresis function of the buffer gate 3 can prevent inversion of the output caused by minute noises.

Figure 6A:
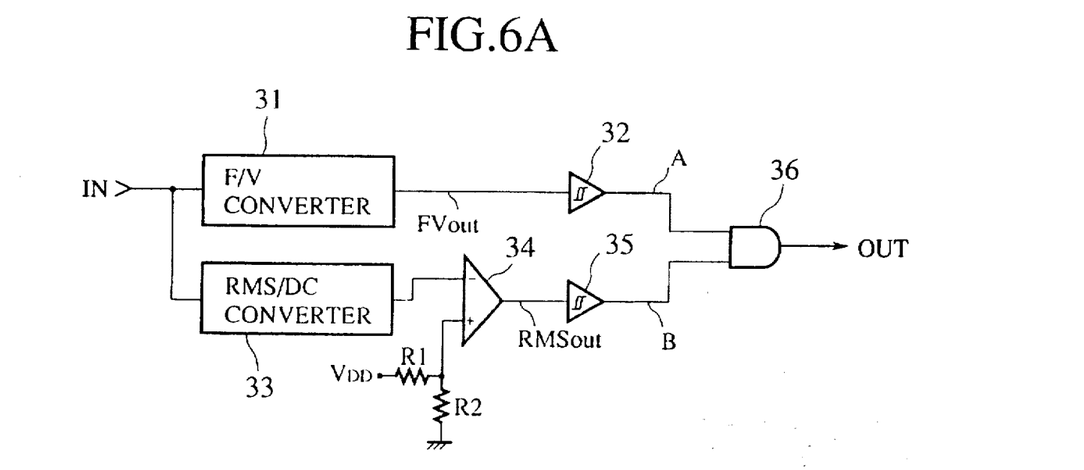
FIG. 6A is circuit diagram showing a configuration of a monitor circuit in FIG. 5.
Figure 6B:
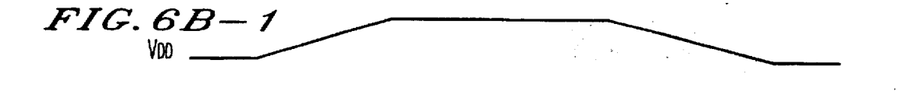
FIG. 6B is a timing chart illustrating an operation of the monitor circuit.
Figure 6B:
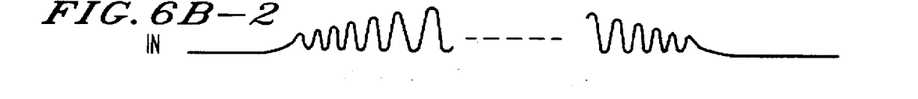
Figure 6B:
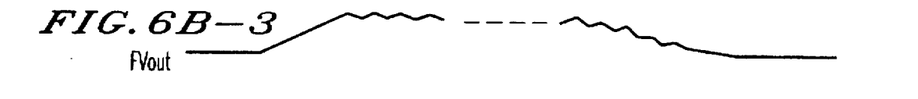
Figure 6B:
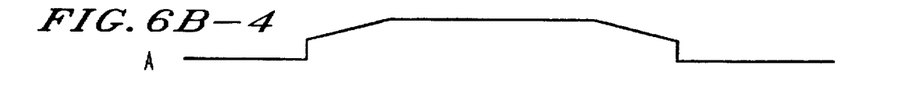
Figure 6B:
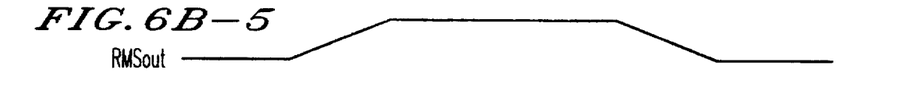
Figure 6B:
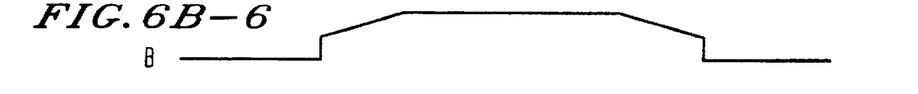
Figure 6B:
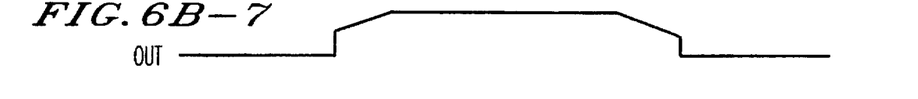

As shown in FIG. 6A, the monitor circuit 4 comprises a frequency/voltage F/V converter 31 for converting frequency of the output signal from the oscillation circuit 2 into voltage, buffer gates 32 and 35, a root mean square/direct current (RMS/DC); same line, change "AC" to alternating current (AC) converter 33 for converting AC voltage output from the oscillation circuit 2 into DC voltage, a comparator 34 for comparing voltage output from the RMS/DC converter 33 with reference voltage, and an AND gate 36. The reference voltage to be input into the comparator 34 is generated by dividing the power supply voltage ($V_{DD}$) by using resistors R1, R2.

FIG. 6B is a timing chart illustrative of an operation of the monitor circuit 4. In FIG. 6B, $FV_{out}$, A, $RMS_{out}$, and B denote output voltage waveforms of the F/V converter 31, the buffer gate 32, the RMS/DC converter 33, and the buffer gate 35 respectively.

The monitor circuit 4 constructed as above monitors frequency and amplitude of the reference signal output from the oscillation circuit 2. The monitor circuit 4 outputs an enable signal at the rise time of the power supply voltage when frequency and amplitude of the reference signal come to certain values to generate the clock signal. The monitor circuit 4 also outputs a disable signal at the fall time of the power supply voltage before frequency and amplitude of the reference signal get to certain values not to generate the clock signal, e.g., before amplitude of the reference signal reaches about 80% of the normal amplitude, together with the reduction in the power supply voltage. The monitor circuit 4 outputs a disable signal at a timing when the microcomputer 1 is reset according to the reduction in power supply voltage before the clock signal is terminated.

The reset circuit 5 is constituted as shown in FIG. 3, for example, like the conventional reset circuit. The reset circuit 5 outputs a reset release primitive signal of high level at the rise time of the power supply voltage, while it outputs a reset primitive signal of low level at the fall time of the power supply voltage.

Based on either the reset release primitive signal output from the reset circuit 5 or the enable signal output from the monitor circuit 4, the OR gate 6 and the AND gate 7 transfer the clock signal output from the buffer gate 3 to the microcomputer 1 at the rise time of the power supply voltage. On the contrary, based on either the reset primitive signal output from the reset circuit 5 or the disable signal output from the monitor circuit 4, the OR gate 6 and the AND gate 7 terminate supply of the clock signal to the microcomputer 1 at the fall time of the power supply voltage.

In the delay circuit constructed by the OR gate 8 and the F/F series 9 consisting of n cascade-connected F/Fs, the F/F series 9 are set by the enable signal output from the monitor circuit 4 when the first clock signal is generated by the buffer gate 3 at the rise time of power supply voltage. Then the clock signal output from the buffer gate 3 is supplied to respective clock terminals CP of the F/F series 9 via the AND gate 7 and the OR gate 8. Then the delay signal of high level is output from the F/F at the final stage after a time interval which is long enough to generate n clock signals has been elapsed. And then the delay signal is supplied to the OR gate 8 and the AND gate 10 to terminate input of the clock signal into the clock terminals CP of the F/F series 9. These conditions are reset and released if the disable signal is supplied from the monitor circuit 4.

Based on the enable signal output from the monitor circuit 4, the delay signal output from the delay circuit, and the reset release primitive signal output from the reset circuit 5, the AND gate 10 supplies the reset release signal to the microcomputer 1 at the rise time of the power supply voltage. In contrast, according to the firstly low-leveled signal of the reset primitive signal output from the reset circuit 5 and the disable signal output from the monitor circuit 4, the AND gate 10 supplies the reset signal of low level to the microcomputer 1 at the fall time of the power supply voltage.

Figure 7:
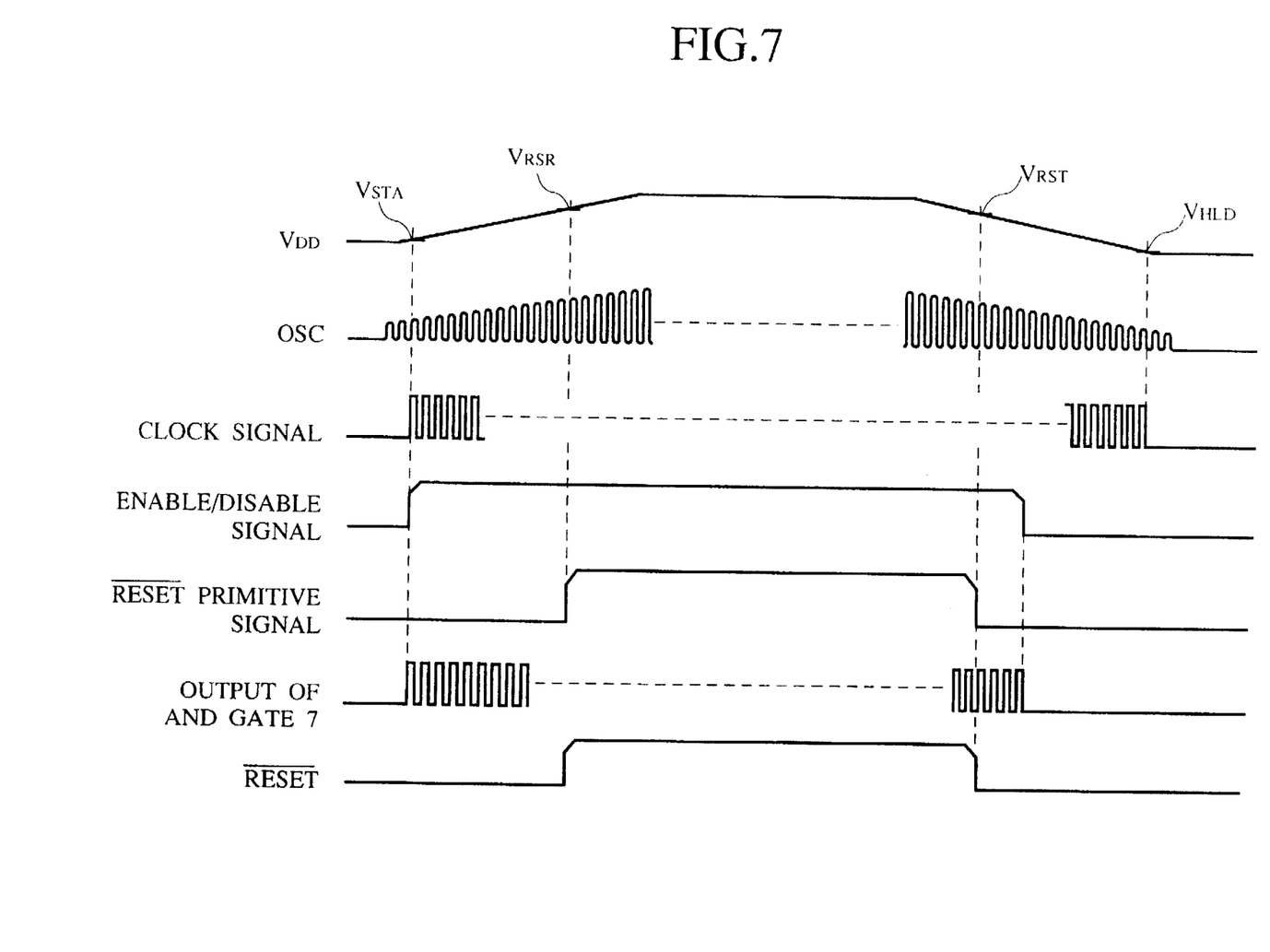
FIG. 7 is a timing chart illustrating an operation of the information processing device according to the embodiment of the present invention if signal sequence is in a normal state.

In the above configuration, first the case will be explained with reference to FIG. 7 hereinbelow where the power supply voltage rises up in a normal state.

In the event that the power supply voltage rises up in a normal state, when the power supply voltage rises up to the above $V_{STA}$ and then the reference signal output from the oscillation circuit 2 comes to predetermined frequency and amplitude, the clock signal is output from the buffer gate 3 and also the enable signal of high level is supplied from the monitor circuit 4 to the OR gate 6 and the AND gate 10. Hence, the clock signal is supplied to the microcomputer 1 via the AND gate 7.

When n clock signals including the first clock signal have been output after the first clock signal has been output from the AND gate 7, a delay signal of high level is supplied from the delay circuit to the AND gate 10. In turn, when the power supply voltage reaches the above $V_{RSR}$, the reset release primitive signal of high level is output from the reset circuit 5 and then supplied as the reset signal to the microcomputer 1 via the AND gate 10.

In this manner, if the reset release signal is input into the microcomputer 1 after the clock signal is input into the microcomputer 1, normal rising sequences can be carried out in the microcomputer 1.

Figure 8:
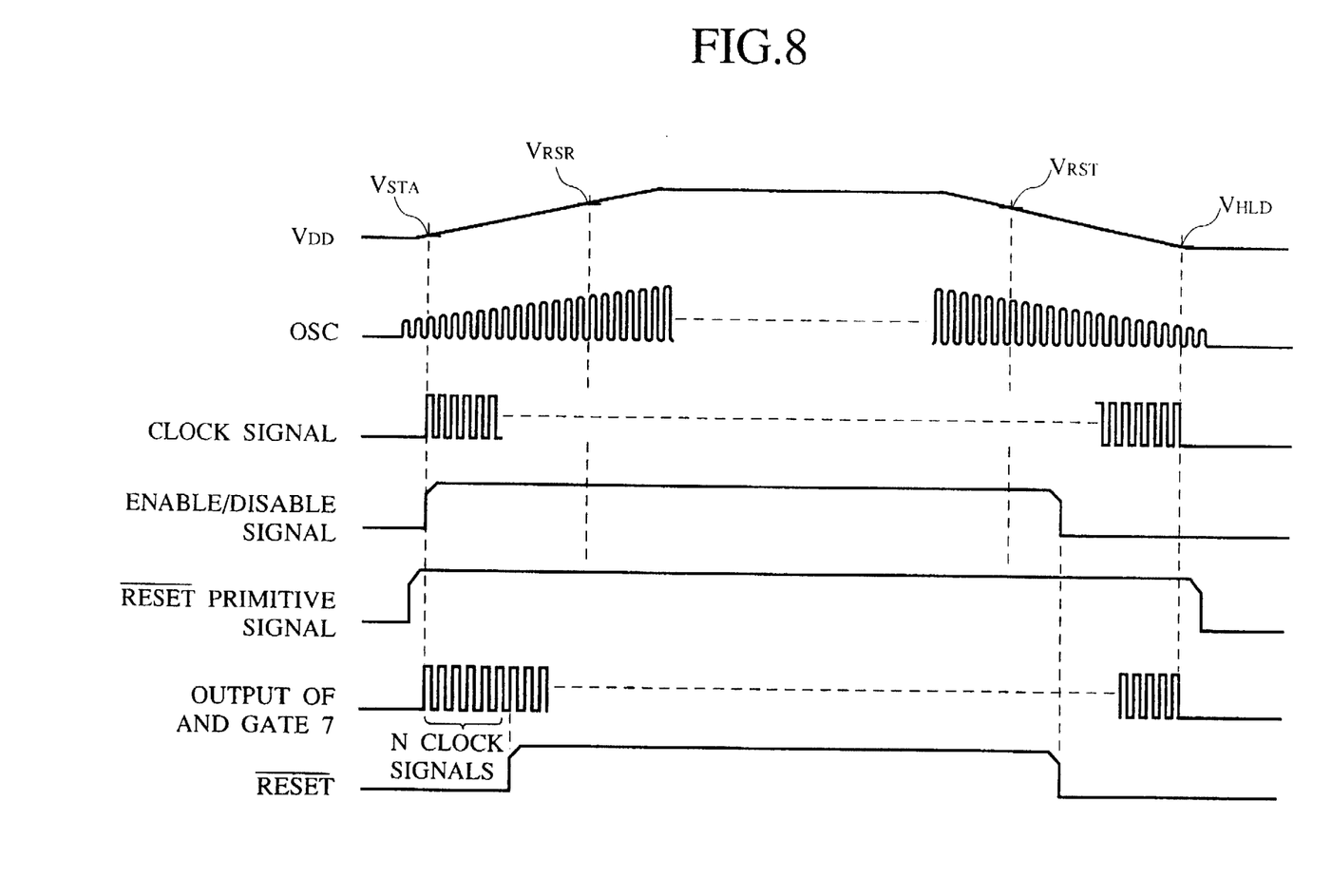
FIG. 8 is a timing chart illustrating an operation of the information processing device according to the embodiment of the present invention if signal sequence is in an abnormal state.

Next, an abnormal state will be explained with reference to FIG. 8 hereinbelow wherein the reset release primitive signal is output from the reset circuit 5 before the clock signal is generated.

In this case, since the enable signal and the delay signal have not been supplied to the reset circuit 5, the reset release primitive signal has been output from the reset circuit 5, nevertheless the reset signal has not been supplied to the microcomputer 1 yet.

In such a condition, when the clock signal is output from the buffer gate 3 with some delay after the reset release primitive signal has been generated, the enable signal is provided from the monitor circuit 4 to the OR gate 6 and the AND gate 10. As a result, the clock signal is supplied to the microcomputer 1 via the AND gate 7. Thereafter the delay signal is supplied to the AND gate 10. In consequence, the reset release primitive signal is supplied as the reset signal to the microcomputer 1 via the AND gate 10.

As discussed earlier, even in the abnormal state such that the reset release primitive signal is output from the reset circuit 5 before the clock signal is generated, the clock signal is first input into the microcomputer 1 and the reset release signal is then input into the microcomputer 1. Therefore, normal rising sequences can be carried out in the microcomputer 1 so that disadvantages such as runaway of the microcomputer 1 can be prevented.

Next, the case will be explained with reference to FIG. 7 hereinbelow where the power supply voltage falls down in a normal state.

In the event that the power supply voltage falls down in a normal state, when the power supply voltage descends to the above $V_{RST}$, the reset primitive signal of low level is output from the reset circuit 5 and thus the reset signal is supplied to the microcomputer 1 via the AND gate 10 to reset the microcomputer 1.

In the next, when the fact that the amplitude of the reference signal is reduced to about 80% of the normal amplitude, for example, can be detected by the monitor circuit 4 before the power supply voltage further descends to the above $V_{HLD}$ so that the clock signal cannot be generated based on the amplitude of the reference signal oscillated from the oscillation circuit 2, i.e., before the power supply voltage reaches $V_{HLD}$, the disable signal is supplied from the monitor circuit 4 to the OR gate 6. Because the reset primitive signal of low level has been supplied to the OR gate 6, one input of the AND gate 7 is turned into a low level and the clock signal is output from the buffer gate 3, but supply of the clock signal to the microcomputer 1 is terminated.

Like the above, since the clock signal to be supplied to the microcomputer 1 is terminated after the reset signal has been input into the microcomputer 1, normal rising sequences can be carried out in the microcomputer 1.

On the other hand, an abnormal state will be explained with reference to FIG. 8 hereinbelow wherein the clock signal is terminated before the reset primitive signal is output from the reset circuit 5.

In this event, reduction in the amplitude of the reference signal can be detected by the monitor circuit 4, as mentioned above, before the clock signal is terminated with the descend of power supply voltage, the disable signal of low level is provided from the monitor circuit 4 to the AND gate 10. Accordingly, even though the reset primitive signal has not been output from the reset circuit 5, a low level signal is supplied from the AND gate 10 to the reset terminal of the microcomputer 1 to reset the microcomputer 1.

Subsequently, the amplitude of the reference signal output from the oscillation circuit 2 is lowered as the power supply voltage is reduced, and generation of the clock signal is then ended. Thus supply of the clock signal to the microcomputer 1 is terminated.

In this fashion, even in the abnormal state wherein the clock signal is terminated before the reset primitive signal is output from the reset circuit 5, normal falling sequences can be carried out in the microcomputer 1 since supply of the clock signal to the microcomputer 1 is stopped after the microcomputer 1 has been reset. Therefore, disadvantages such as runaway of the microcomputer 1 can be prevented.

Accordingly, if the configuration of the above embodiment is adopted, there is no necessity of repeating designs of the oscillation circuit and the reset circuit again and again to keep $V_{STA}$, $V_{RSR}$, $V_{RST}$ and $V_{HLD}$ in respective states shown in FIG. 10 at all times even though considering variation in manufacture into account. Thus, the rising and falling operations of the microcomputer 1 can be always effected under the normal condition.

As has been discussed above, according to the present invention, the device can be so designed that, at the rise time of power supply voltage, the reset release signal is supplied to the microcomputer after the predetermined time lapse after the clock signal is supplied to the microcomputer while, at the fall time of power supply voltage, the reset signal is supplied to the microcomputer by detecting a state prior to termination of the clock signal. For this reason, regardless of variation in manufacturing and circuit configurations, the clock signal, the reset signal, and the reset release signal can be supplied at appropriate timings to the information processing device at the rise and fall times of the power supply voltage.

Hence, there is no need to repeat design operations many times as in the prior art, and rise up and fall down of the microcomputer can always be carried out in a normal state so that malfunction of the microcomputer such as runaway can be prevented.

It should be understood that many modifications and adaptations of the invention will become apparent to those skilled in the art and it is intended to encompass such obvious modifications and changes in the scope of the claims appended hereto.

What is claimed is:

1. An information processing device comprising:

information processing means which operates in synchronism with a clock signal, and is released from a reset state by a reset release signal and is reset by a reset signal;

clock signal generating means for generating a clock signal to be supplied to said information processing means;

reset signal generating means for generating a reset primitive signal and a reset release primitive signal;

monitoring means for monitoring said clock signal generated by said clock signal generating means to detect generation of said clock signal and a previous state when said clock signal is terminated; and controlling means for receiving said reset primitive signal, said reset release primitive signal, and detected results of said monitoring means, and supplying said reset release signal to said information processing means at the rise time of power supply voltage after a predetermined time lapse after generation of said clock signal is detected and supplying said reset signal to said information processing means at the fall time of power supply voltage when a previous state when said clock signal is terminated is detected.

2. An information processing device comprising:

an information processing portion which operates in synchronism with a clock signal, and is released from a reset state by a reset release signal and is reset by a reset signal;

an oscillation circuit for oscillating a reference signal to generate said clock signal;

a clock signal generating circuit for receiving said reference signal output from said oscillation circuit to generate said clock signal when said reference signal gets to a predetermined frequency and amplitude;

a monitor circuit for monitoring frequency and amplitude of said reference signal output from said oscillation circuit, outputting an enable signal at the rise time of power supply voltage when said frequency and amplitude of said reference signal reach certain values at which said clock signal is to be generated, and outputting a disable signal at the fall time of the power supply voltage before said frequency and amplitude of said reference signal reach certain values at which said clock signal is not to be generated;

a reset circuit for outputting a reset primitive signal and a reset release primitive signal;

a delay circuit for outputting a delay signal at the rise time of power supply voltage after a predetermined time lapse after a first clock signal is generated by said clock signal generating circuit;

a first control gate for supplying said clock signal to said information processing portion in response to said reset release primitive signal or said enable signal at the rise time of power supply voltage, and cutting off supply of said clock signal to said information processing portion in response to said reset primitive signal and said disable signal at the fall time of power supply voltage; and a second control gate for supplying said reset release signal to said information processing portion in response to said enable signal, said delay signal, and said reset release primitive signal at the rise time of power supply voltage, and supplying said reset signal to said information processing portion in response to said reset primitive signal or said disable signal at the fall time of power supply voltage.

3. An information processing device according to claim 2, wherein said delay circuit comprises, a third control gate for receiving an output from said first control gate and said delay signal as inputs, and a plurality of flip-flops consisting of n-stages series-connected flip-flops, for receiving an output from said third control gate to a clock terminal at a first stage.

4. An information processing device according to claim 2, wherein said monitor circuit comprises, a frequency/voltage (F/V) converter for converting frequency of said signal output from said oscillation circuit into voltage, a root mean square/direct current (RMS/DC) converter for converting AC voltage output from said oscillation circuit into DC voltage, a comparator for comparing voltage obtained by said RMS/DC converter with reference voltage, and an AND gate for receiving an output from said F/V converter and an output from said comparator, and performing their logical product operation.

* * * * *